(12) United States Patent
Sarkar et al.

(10) Patent No.: US 8,199,696 B2
(45) Date of Patent: Jun. 12, 2012

(54) METHOD AND APPARATUS FOR POWER CONTROL IN A WIRELESS COMMUNICATION SYSTEM

(75) Inventors: Sandip Sarkar, San Diego, CA (US); Jack M. Holtzman, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1151 days.

(21) Appl. No.: 09/823,015

(22) Filed: Mar. 29, 2001

(65) Prior Publication Data

US 2002/0167907 A1    Nov. 14, 2002

(51) Int. Cl.
*H04W 4/00* (2006.01)
(52) U.S. Cl. ....................................................... 370/328
(58) Field of Classification Search .................. 370/235, 370/252, 310.2, 317, 318, 328, 332, 333, 370/338, 342
See application file for complete search history.

(56) References Cited

U.S. PATENT DOCUMENTS

| | | | |
|---|---|---|---|
| 3,310,631 A | 3/1967 | Brown |
| 3,714,508 A | 1/1973 | Harnden, Jr. et al. |
| 3,715,508 A | 2/1973 | Blasbalg |
| 4,052,565 A | 10/1977 | Baxter et al. |
| 4,112,257 A | 9/1978 | Frost |
| 4,123,718 A | 10/1978 | Lampert et al. |
| 4,222,115 A | 9/1980 | Cooper et al. |
| 4,225,976 A | 9/1980 | Osborne et al. |
| 4,291,409 A | 9/1981 | Weinberg et al. |
| 4,301,530 A | 11/1981 | Gutleber et al. |
| 4,460,992 A | 7/1984 | Gutleber et al. |
| 4,472,815 A | 9/1984 | Gutleber et al. |
| 4,495,648 A | 1/1985 | Giger et al. |
| 4,580,262 A | 4/1986 | Naylor et al. |
| 4,635,221 A | 1/1987 | Kerr et al. |
| 4,641,322 A | 2/1987 | Hasegawa et al. |
| 4,672,658 A | 6/1987 | Kavehrad et al. |
| 4,688,035 A | 8/1987 | Gray et al. |
| 4,730,340 A | 3/1988 | Frazier, Jr. et al. |
| 4,765,753 A | 8/1988 | Schmidt et al. |
| 4,811,421 A | 3/1989 | Havel et al. |
| 4,813,040 A | 3/1989 | Futato et al. |
| 4,872,200 A | 10/1989 | Jansen et al. |
| 4,901,307 A | 2/1990 | Gilhousen et al. |
| 4,933,952 A | 6/1990 | Albrieux et al. |

(Continued)

FOREIGN PATENT DOCUMENTS

CN    1172570 A    2/1998

(Continued)

OTHER PUBLICATIONS

U.S. Appl. No. 09/426,016, entitled "Method and Apparatus for Minimizing Total Transmission Energy in a Communication System Employing Retransmission of Frame Received in Error," filed Oct. 22, 1999; Jack Holtzman, et al., Qualcomm Incorporated, San Diego, California.

(Continued)

*Primary Examiner* — Anh-Vu Ly
(74) *Attorney, Agent, or Firm* — Rupit M. Patel

(57) ABSTRACT

Method and apparatus for power control in a packet-data switched communication system by adapting a transmission energy setpoint to transmission quality and adjusting the retransmission energy setpoint accordingly. In one embodiment, the retransmission energy setpoint is adjusted as a function of retransmission quality.

21 Claims, 8 Drawing Sheets

U.S. PATENT DOCUMENTS

| | | | |
|---|---|---|---|
| 4,939,745 | A | 7/1990 | Kirimoto et al. |
| 5,003,533 | A | 3/1991 | Watanabe et al. |
| 5,003,619 | A | 3/1991 | Morris et al. |
| 5,022,046 | A | 6/1991 | Morrow, Jr. et al. |
| 5,029,331 | A | 7/1991 | Heichler et al. |
| 5,056,109 | A | 10/1991 | Gilhousen et al. |
| 5,068,849 | A | 11/1991 | Tanaka et al. |
| 5,101,501 | A | 3/1992 | Gilhousen et al. |
| 5,103,459 | A | 4/1992 | Gilhousen et al. |
| 5,107,487 | A | 4/1992 | Vilmur et al. |
| 5,109,390 | A | 4/1992 | Gilhousen et al. |
| 5,128,965 | A | 7/1992 | Henriksson et al. |
| 5,136,586 | A | 8/1992 | Greenblatt et al. |
| 5,157,672 | A | 10/1992 | Kondou et al. |
| 5,159,608 | A | 10/1992 | Falconer et al. |
| 5,204,876 | A | 4/1993 | Bruckert et al. |
| 5,212,684 | A | 5/1993 | MacNamee et al. |
| 5,216,692 | A | 6/1993 | Ling et al. |
| 5,220,678 | A | 6/1993 | Feei et al. |
| 5,239,667 | A | 8/1993 | Kanai et al. |
| 5,245,629 | A | 9/1993 | Hall et al. |
| 5,258,983 | A | 11/1993 | Lane et al. |
| 5,263,050 | A | 11/1993 | Sutterlin et al. |
| 5,267,262 | A | 11/1993 | Wheatley, III et al. |
| 5,283,780 | A | 2/1994 | Schuchman et al. |
| 5,287,555 | A | 2/1994 | Wilson et al. |
| 5,299,229 | A | 3/1994 | Zscheile, Jr. et al. |
| 5,305,468 | A | 4/1994 | Bruckert et al. |
| 5,341,396 | A | 8/1994 | Higgins et al. |
| 5,383,219 | A | 1/1995 | Wheatley, III et al. |
| 5,390,338 | A | 2/1995 | Bodin et al. |
| 5,396,516 | A | 3/1995 | Padovani et al. |
| 5,414,796 | A | 5/1995 | Jacobs et al. |
| 5,465,389 | A | 11/1995 | Agrawal et al. |
| 5,465,399 | A | 11/1995 | Oberholtzer et al. |
| 5,485,486 | A | 1/1996 | Gilhousen et al. |
| 5,487,180 | A | 1/1996 | Ohtake et al. |
| 5,504,773 | A | 4/1996 | Padovani et al. |
| 5,506,865 | A | 4/1996 | Weaver, Jr. et al. |
| 5,511,073 | A | 4/1996 | Padovani et al. |
| 5,528,593 | A | 6/1996 | English et al. |
| 5,548,616 | A | 8/1996 | Mucke et al. |
| 5,570,353 | A | 10/1996 | Keskitalo et al. |
| 5,574,984 | A | 11/1996 | Reed et al. |
| 5,590,408 | A | 12/1996 | Weiland et al. |
| 5,590,409 | A | 12/1996 | Sawahashi et al. |
| 5,604,766 | A | 2/1997 | Dohi et al. |
| 5,629,934 | A | 5/1997 | Ghosh et al. |
| 5,655,220 | A | 8/1997 | Weiland et al. |
| 5,659,569 | A | 8/1997 | Padovani et al. |
| 5,732,077 | A | 3/1998 | Whitehead et al. |
| 5,842,113 | A | 11/1998 | Nanda et al. |
| 5,845,208 | A | 12/1998 | Hottinen et al. |
| 5,857,155 | A | 1/1999 | Hill et al. |
| 5,881,367 | A | 3/1999 | Calot et al. |
| 5,893,035 | A | 4/1999 | Chen |
| 5,903,554 | A | 5/1999 | Saints |
| 5,924,043 | A | 7/1999 | Takano et al. |
| 5,926,767 | A | 7/1999 | Olds et al. |
| 5,963,870 | A | 10/1999 | Chheda et al. |
| 6,031,828 | A | 2/2000 | Koro et al. |
| 6,034,971 | A | 3/2000 | Love et al. |
| 6,035,209 | A | 3/2000 | Tiedemann, Jr. et al. |
| 6,075,974 | A | 6/2000 | Saints et al. |
| 6,084,904 | A * | 7/2000 | Wang et al. ............... 375/130 |
| 6,085,108 | A | 7/2000 | Knutsson et al. |
| 6,101,168 | A | 8/2000 | Chen et al. |
| 6,137,840 | A | 10/2000 | Tiedemann, Jr. et al. |
| 6,138,033 | A | 10/2000 | Kitade et al. |
| 6,147,981 | A | 11/2000 | Prescott et al. |
| 6,151,696 | A | 11/2000 | Miller et al. |
| 6,163,570 | A | 12/2000 | Olafsson et al. |
| 6,167,273 | A | 12/2000 | Mandyam et al. |
| 6,175,744 | B1 | 1/2001 | Esmailzadeh et al. |
| 8,215,780 | | 4/2001 | Peters et al. |
| 6,240,071 | B1 | 5/2001 | Willenegger et al. |
| 6,249,682 | B1 | 6/2001 | Kubo et al. |
| 6,272,355 | B1 | 8/2001 | Lokio et al. |
| 6,298,242 | B1 * | 10/2001 | Schiff ............... 455/522 |
| 6,335,923 | B2 | 1/2002 | Kubo et al. |
| 6,337,973 | B1 | 1/2002 | Agin et al. |
| 6,341,224 | B1 | 1/2002 | Dohi et al. |
| 6,356,745 | B1 | 3/2002 | Lee et al. |
| 6,373,823 | B1 | 4/2002 | Chen et al. |
| 6,377,813 | B1 | 4/2002 | Kansakoski et al. |
| 6,445,684 | B1 | 9/2002 | Schwengler et al. |
| 6,449,463 | B1 | 9/2002 | Schiff et al. |
| 6,490,460 | B1 | 12/2002 | Soliman et al. |
| 6,529,709 | B1 | 3/2003 | Shen et al. |
| 6,546,260 | B2 | 4/2003 | Esmailzadeh et al. |
| 6,549,785 | B1 | 4/2003 | Agin et al. |
| 6,564,042 | B1 | 5/2003 | Jou et al. |
| 6,594,500 | B2 | 7/2003 | Bender et al. |
| 6,611,548 | B2 | 8/2003 | Lomp et al. |
| 6,624,970 | B1 | 9/2003 | Sasaki |
| 6,628,957 | B1 | 9/2003 | Weaver et al. |
| 6,628,958 | B1 | 9/2003 | Kamel et al. |
| 6,711,150 | B1 * | 3/2004 | Vanghi ............... 370/342 |
| 6,711,384 | B2 | 3/2004 | Kubo et al. |
| 6,714,597 | B1 | 3/2004 | Antonio et al. |
| 6,745,044 | B1 | 6/2004 | Holtzman et al. |
| 6,754,475 | B1 | 6/2004 | Harrison et al. |
| 6,760,597 | B2 * | 7/2004 | Salvarani et al. ............... 455/522 |
| 6,771,700 | B1 * | 8/2004 | Razoumov et al. ............... 375/227 |
| 6,792,248 | B1 | 9/2004 | Naghian et al. |
| 6,885,875 | B1 | 4/2005 | Benz et al. |
| 6,898,417 | B1 | 5/2005 | Moulsley et al. |
| 6,912,228 | B1 | 6/2005 | Dahlman et al. |
| 6,915,113 | B1 | 7/2005 | Cardiff et al. |
| 6,940,442 | B2 | 9/2005 | Van Schendel et al. |
| 6,973,326 | B2 | 12/2005 | Noh et al. |
| 7,062,287 | B2 | 6/2006 | Nakamura et al. |
| 7,918,781 | B1 | 4/2011 | Smyth et al. |
| 2001/0040880 | A1 * | 11/2001 | Chen et al. ............... 370/337 |
| 2008/0062912 | A1 * | 3/2008 | Tiedemann et al. ............... 370/318 |

FOREIGN PATENT DOCUMENTS

| | | |
|---|---|---|
| EP | 0087243 A2 | 8/1983 |
| EP | 0412583 A2 | 2/1991 |
| EP | 0418865 A2 | 3/1991 |
| EP | 0444592 A2 | 9/1991 |
| EP | 0462952 A1 | 12/1991 |
| EP | 0564937 A1 | 10/1993 |
| EP | 0680159 A2 | 11/1995 |
| EP | 0696857 A1 | 2/1996 |
| EP | 0728378 A1 | 8/1996 |
| EP | 0899906 A2 | 3/1999 |
| GB | 2022365 A | 12/1979 |
| GB | 2182528 A | 5/1987 |
| GB | 2268365 A | 1/1994 |
| GB | 2273009 A | 6/1994 |
| JP | 890169915 | 7/1989 |
| JP | 3035625 | 2/1991 |
| JP | 06326691 | 11/1994 |
| JP | 06087245 | 10/1995 |
| JP | 7283758 A | 10/1995 |
| JP | 08008817 | 1/1996 |
| JP | 10079776 A | 3/1998 |
| JP | 10503337 | 3/1998 |
| JP | 11015057 | 1/1999 |
| JP | 11205861 | 7/1999 |
| JP | 11220438 A | 8/1999 |
| JP | 2001007764 A | 1/2001 |
| JP | 2002009692 A | 1/2002 |
| KR | 20010012105 A | 12/2001 |
| WO | WO9107030 A1 | 5/1991 |
| WO | WO9300777 A1 | 1/1993 |
| WO | WO9406218 A1 | 3/1994 |
| WO | WO9513647 | 5/1995 |
| WO | WO9703403 | 1/1997 |
| WO | 98/49785 | 11/1998 |
| WO | 00/77947 A1 | 12/2000 |
| WO | WO0128127 A1 | 4/2001 |

OTHER PUBLICATIONS

G.D. Mandyam "Power Control Based on Radio Link Protocol in cdma2000," IEEE Wireless Communications and Networking Conference, New Orleans, LA, USA Sep. 21-24, 1999, pp. 1368-1372, vol. 3.

CDMA2000 TIA/EIA/IS-2000.1-A-4-A.

International Search Report PCT/US02/009828, International Search Authority—European Patent Office—Jul. 17, 2002.

Kreyszig, Erwin, "Orthogonal Sets of Functions/Chapter 4," Advanced Engineering Mathematics, p. 186-190, John Wiley & Sons, Inc. 1979.

Soliman S et al: "CDMA Reverse Link Open Loop Power Control" Communication For Global Users. Including A Communications Theory Mini Conference. Orlando, Dec. 6-9, 1992, Proceedings of The Global Telecommunications Conference (GLOBECOM), New York, IEEE, US.

TIA/EIA/IS-707A.8 "Data Service Options for Spread Spectrum Systems: Radio Link Protocol Type 2" pp. 1-1:4:12 (Mar. 1999).

TIA/EIA/IS-856-A CDMA2000 HDR.

Co-pending U.S. Appl. No. 07/713,661, filed on Jun. 11, 1991.

TIA/EIA/IS-707-A110 Data Service Options for Spread Spectrum Systems: Radio Link Protocol Type 3 pp. 1-1:4-17 (Dec. 1999).

\* cited by examiner

| FER | $FER_0$ |
|---|---|
| NO. OF TRANSMISSION | I |
| POWER SEQUENCE | $E_0$ |

FIG. 3

| FER | $FER_1$ | $FER_2$ |
|---|---|---|
| NO. OF TRANSMISSION | I | 2 |
| POWER SEQUENCE | $E_1$ | $E_2$ |

FIG. 4

METHOD AND APPARATUS FOR POWER CONTROL IN A WIRELESS COMMUNICATION SYSTEM

CO-PENDING RELATED APPLICATIONS FOR PATENT

The present Application for Patent is related to U.S. Pat. No. 6,137,840 entitled "METHOD AND APPARATUS FOR PERFORMING FAST POWER CONTROL IN A MOBILE COMMUNICATION SYSTEM," issued Oct. 24, 2000; and U.S. patent application Ser. No. 09/426,016 entitled "METHOD AND APPARATUS FOR MINIMIZING TOTAL TRANSMISSION ENERGY IN A COMMUNICATION SYSTEM EMPLOYING RETRANSMISSION OF FRAME RECEIVED IN ERROR," filed Oct. 22, 1999; each assigned to the assignee hereof and each expressly incorporated herein by reference.

BACKGROUND

1. Field

The present method and apparatus relate generally to communication, and more specifically to power control in a wireless communication system.

2. Background

Increasing demand for wireless data transmission and the expansion of services available via wireless communication technology have led to the development of systems capable of handling voice and data services. One spread spectrum system designed to handle the various requirements of these two services is a Code Division Multiple Access, CDMA, system referred to as cdma2000, which is specified in "TIA/EIA/IS-2000 Standards for cdma2000 Spread Spectrum Systems." Enhancements to cdma2000 as well as alternate types of voice and data systems are also in development.

As the amount of data transmitted and the number of transmissions increase, the limited bandwidth available for radio transmissions becomes a critical resource. There is a need, therefore, for an efficient and accurate method of transmitting information in a communication system that optimizes use of available bandwidth.

SUMMARY

Embodiments disclosed herein address the above stated needs by providing in a wireless communication system, a method of power control that determines an energy setpoint to achieve a transmission frame error rate, adjusts the energy setpoint on occurrence of a transmission error, determines a retransmission energy setpoint to achieve a retransmission frame error rate, and adjusts the retransmission energy setpoint on occurrence of a retransmission error.

In one aspect, a base station apparatus includes a processor operative to control transmission and retransmission of data, and a memory storage device operative for storing a plurality of computer-readable instructions. The instructions include a first set of instructions for determining a transmission frame error rate and a retransmission frame error rate, a second set of instructions for determining a transmission energy setpoint as a function of the transmission frame error rate and the transmission quality, and a third set of instructions for determining a retransmission energy setpoint as a function of the retransmission frame error rate and the retransmission quality. In one embodiment, the transmission quality is measured by a received error indication signal, wherein the error indication signal may be an error indication bit. According to another embodiment, the third set of instructions determines the retransmission energy setpoint as a function of the retransmission frame error rate, the retransmission quality, and the transmission energy setpoint, such as by maintaining a delta value between the transmission energy setpoint and the retransmission energy setpoint.

In another aspect, a method in a wireless communication system includes determining a transmission energy setpoint to achieve a transmission frame error rate, adjusting the transmission energy setpoint on occurrence of a transmission error, determining a retransmission energy setpoint to achieve a retransmission frame error rate, and adjusting the retransmission energy setpoint on occurrence of a retransmission error. In one embodiment, adjusting the transmission energy setpoint further includes adjusting the retransmission energy setpoint as a function of the transmission energy setpoint. In another embodiment, adjusting the retransmission energy setpoint further includes adjusting the retransmission energy setpoint to achieve a desired frame error rate for retransmission.

BRIEF DESCRIPTION OF THE DRAWINGS

FIG. 3 is a diagram of a transmission scenario in a wireless communication system.

FIG. 4 is a diagram of transmission and retransmission scenarios and in a wireless communication system.

DETAILED DESCRIPTION

Figure 1:
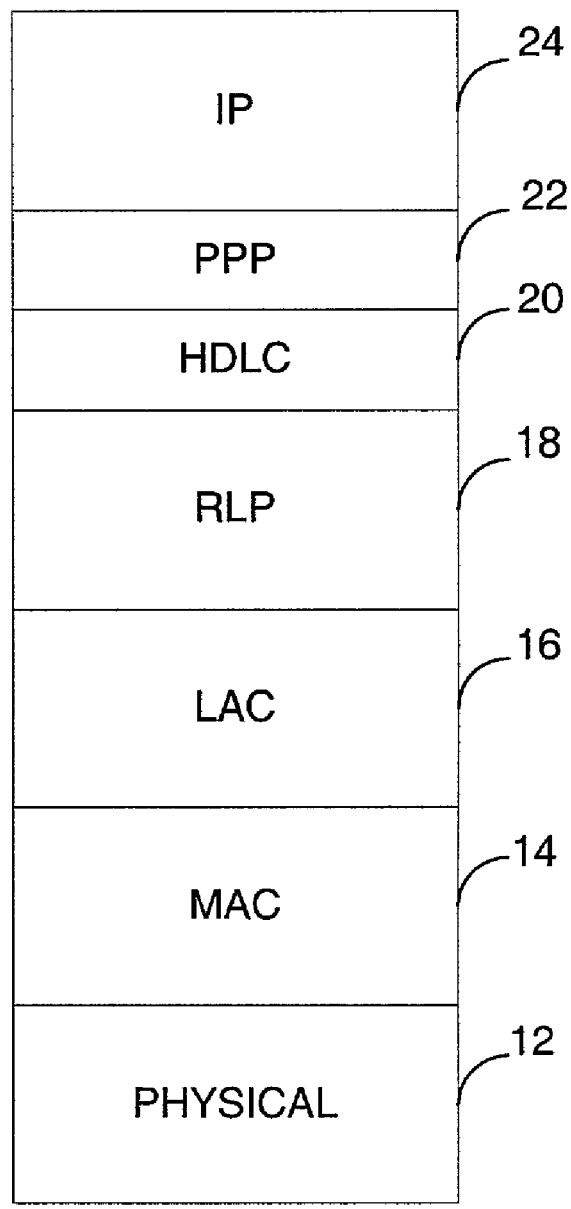
FIG. 1 is a diagram of a channel architecture in a wireless communication system.

The word "exemplary" is used exclusively herein to mean "serving as an example, instance, or illustration." Any embodiment described herein as "exemplary" is not necessarily to be construed as preferred or advantageous over other embodiments.

Spread spectrum communication systems, such as Code Division Multiple Access, CDMA, systems detailed in standards including but not limited to the "TIA/EIA/IS-95 Mobile Station-Base Station Compatibility Standard for Dual-Mode Wideband Spread Spectrum Cellular System," hereinafter referred to as "the IS-95 standard," the "TIA/EIA/IS-2000 Standards for cdma2000 Spread Spectrum Systems," hereinafter referred to as "the cdma2000 standard," and/or the "TIA/EIA/IS-856 cdma2000 High Rate Packet Data Air Interface Specification," hereinafter referred to as "the HDR standard," spread signals such that multiple signals occupy a same channel bandwidth, wherein each signal has its own distinct Pseudorandom Noise, PN, sequence.

Operation of a CDMA system is described in the following U.S. Patents: U.S. Pat. No. 4,901,307, entitled "SPREAD SPECTRUM MULTIPLE ACCESS COMMUNICATION SYSTEM USING SATELLITE OR TERRESTRIAL REPEATERS;" U.S. Pat. No. 5,103,459, entitled "SYSTEM AND METHOD FOR GENERATING SIGNAL WAVEFORMS IN A CDMA CELLULAR TELEPHONE SYSTEM;" and U.S. Pat. No. 5,504,773, entitled "METHOD AND APPARATUS FOR THE FORMATTING OF DATA FOR TRANSMISSION; each assigned to the assignee of the present Application for Patent and hereby expressly incorporated by reference.

In a spread spectrum system, multiple users transmit messages simultaneously over a same channel bandwidth. As the frequency spectrum is a finite resource, these systems provide methods for maximizing the use of this resource by sharing the spectrum while supporting a large number of users with minimal interference. The extension of these methods to the high speed transmission of data allows reuse of existing hardware and software. Designers already familiar with such standards and methods may use this knowledge and experience to extend these systems to high speed data transmissions.

In a wireless communication system, including spread spectrum systems, a mobile unit communicates with landline communication network(s) through a base station. The mobile unit may be referred to as a mobile station, remote station, subscriber, access terminal, etc. The base station may be referred to as an access network, etc. The mobile station transmits signals to the base station via a communication link called a Reverse Link, RL, and the base station sends signals to a mobile station via a communication link called a Forward Link, FL. On the RL, each transmitting mobile station or remote station acts as interference to other remote stations in the network.

As each user transmits to and receives from the base station, other users are concurrently communicating with the base station. Each user's transmissions on the RL introduces interference to other users. To overcome interference in the received signals, a demodulator seeks to maintain a sufficient ratio of bit energy to interference power spectral density, referred to as $E_b/N_0$, in order to demodulate the signal at an acceptable probability of error. Power Control, PC, is a process that adjusts the transmitter power of one or both of the FL and the RL to satisfy a given error criteria. Ideally, the power control process adjusts the transmitter power(s) to achieve at least the minimum required $E_b/N_0$ at the designated receiver. Still further, it is desirable that no transmitter uses more than the minimum $E_b/N_0$ required to achieve a desired Quality of Service, QOS. This ensures that any benefit to one user achieved through the power control process is not at the unnecessary expense of any other user.

In a CDMA communication system, each user appears as random noise to other users in the system due to the various spreading codes used for user identification. Controlling the power of an individual user reduces interference to others throughout the system. Without power control, multiple users at different distances from a common base station would transmit at a same power level. Transmissions from those users proximate the base station are then received at the base station having a higher energy resulting in a Signal-to-Noise Ratio, SNR, disparity between users. This inequity is termed the "near-far problem." As each user needs to attain a required SNR level, the near-far problem limits the capacity of the system. Power control is used to provide smooth operation in a spread-spectrum system.

Power control impacts the capacity of the system by ensuring that each transmitter only introduces a minimal amount of interference to other users; and thus, increases processing gain. Processing gain is the ratio of the transmission bandwidth, W, to the data rate, R. The ratio of $E_b/N_0$ to W/R is related to SNR. Processing gain overcomes a finite amount of interference from other users, i.e., total noise. System capacity is, therefore, proportional to processing gain and SNR. Feedback information is provided from a receiver to a transmitter as a link quality measure. The feedback ideally is a fast transmission having low latency. Power control then uses this feedback information regarding link quality to adjust transmission parameter(s).

Power control allows the system to adapt to changing conditions within an environment, including but not limited to the geographical conditions and mobile velocity. As the changing conditions impact the quality of a communication link, the transmission parameters adjust to accommodate the changes. This process is referred to as "link adaptation." It is desirable for link adaptation to track the condition(s) of the system as accurately and quickly as possible.

According to one embodiment, link adaptation is controlled by the quality of a communication link, wherein the SNR of the link provides a quality metric for evaluating the link. The SNR of the link may be measured as a function of Carrier-to-Interference ratio, C/I, at the receiver. For voice communications, the quality metric C/I may be used for providing power control commands instructing the transmitter to either increase or decrease power. For packet data communications, such as transmitted in an HDR system as specified in "TIA-856 cdma2000 High Rate Packet Data Air Interface Specification," 3GPP, and 3GPP2, data communications are scheduled among multiple users, where at any given time, only one user receives data from the access network or base station. In a packet-switched data system, the quality metric measurement, such as SNR, may provide valuable information to the base station or access network transmitter in determining proper data rate, encoding, modulation and scheduling of data communications. Therefore, it is beneficial to provide the quality metric efficiently from the remote station to the base station.

To minimize interference and maximize the RL capacity, the transmit power of each remote station is controlled by three RL power control loops. The first power control loop, referred to as "open loop" power control, adjusts the transmit power of the remote station(s) such that the received power from each user is approximately equal at the base station. One power control scheme sets the transmit power inversely proportional to the received power on the FL. In a system according to one embodiment, transmit power is given by $p_{out} = -73 - p_{in}$, wherein $p_{in}$ is the power received by the remote station given in dBm, $p_{out}$ is the transmit power of the remote station given in dBm, and −73 is a constant. Open loop power control is performed at the remote station and is performed without direction from the base station. Open loop power control is initiated when a remote station gains access to the base station and a communication is established. The operating environment continues to change while a communication is active; therefore, the path losses experienced on the FL and RL between the base station and the remote station change as a function of time.

Open loop power control compensates for slow-varying and lognormal shadowing effects, wherein there is a correlation between FL and RL fading. Other effects are frequency-dependent, such as fast Rayleigh fading and others. Specifically, for a given communication link, a unique frequency assignment is given to the FL that is different from the frequency assignment of the RL. Power control using the received signal from one link alone is not sufficient to correct frequency-dependent affects on the other link. For example, the behavior of the FL signals as received at the remote station does not necessarily provide sufficient information for adjustment of RL transmissions that are processed at a different frequency. In other words, open loop power control in isolation will not compensate for frequency-dependent affects.

Another, or an additional power control mechanism, referred to as "closed loop" power control, may be used to resolve power fluctuations due to Rayleigh fading effects, as well as other frequency-dependent effects. After call establishment, closed loop power control is used in coordination with open loop power control. Closed loop power control has an inner loop and an outer loop. The inner loop uses a predetermined SNR threshold or setpoint to make power-up and power-down decisions. The outer loop dynamically adjusts the SNR threshold to maintain a desired link quality.

With respect to the inner loop of the closed loop power control, the base station continuously monitors the RL and measures the link quality. For the RL, closed loop power control adjusts the transmission power of the remote station such that the link quality, as measured by the Energy-per-bit-to-noise-plus-Interference ratio $E_b/I_0$ of the RL signal received at the base station is maintained at a predetermined level. This level is referred to as the $E_b/I_0$ set point. The base station measures the $E_b/I_0$ of the RL signal received at the base station and transmits a RL power control bit to the remote station on the forward traffic channel in response to the measured $E_b/I_0$. When the measured $E_b/I_0$ is too high, the base station instructs the remote station to decrease transmission power. If the measured $E_b/I_0$ is too low, the base station instructs the remote station to increase transmission power. The instructions are sent on a sub-channel of the FL. In one embodiment, the power control instructions are sent as power control bit(s), wherein increases are in +1 dB steps and decreases are in −1 dB steps. According to this embodiment, the RL power control bits are sent 16 times per 20 msec frame, or at an 800 bps rate. The forward traffic channel carries the RL power control bits along with the data from the base station to the remote station.

For packet data transmission, the spread spectrum system transmits packets of data as discrete data frames. The desired level of performance or link quality is typically measured as a function of the Frame-Error-Rate, FER. Calculation of FER introduces time delays in order to accumulate sufficient bits to accomplish the calculation.

The inner loop power control adjusts the $E_b/I_0$ set point such that the desired level of performance, as measured by the FER, is maintained. The required $E_b/I_0$ to obtain a given FER depends upon the propagation conditions. The outer loop power control adjusts the $E_b/I_0$ set point in response to changes in the system.

For packet data transmission, the spread spectrum system transmits packets of data as discrete data frames. The desired level of performance or link quality is typically measured as a function of the FER. Calculation of FER introduces time delays in order to accumulate bits. The inner loop power control then adjusts the $E_b/I_0$ set point such that the desired level of performance, as measured by the FER, is maintained. The required $E_b/I_0$ depends upon the propagation conditions, wherein the $E_b/I_0$ is calculated to obtain a given FER. This power control is often called the outer loop.

On the FL, the transmission power of the base station is controlled for several reasons. A high transmission power from the base station can cause excessive interference with the signals received at other remote stations. Another problem exists for multipaths received at a mobile station, wherein at least some of the multipaths are not resolvable into constituent signals. Those multipaths that are not resolvable create "self-interference." Alternatively, if the transmission power of the base station is too low, the remote station can receive erroneous data transmissions. There may not be sufficient energy for the base station to communicate with all mobile stations, in particular mobile stations not proximate the base station. Terrestrial channel fading and other known factors can affect the quality of the FL signal as received by the remote station. As a result, each base station attempts to adjust its transmission power to maintain the desired level of performance at the remote station.

Power control on the FL is especially important for data transmissions. Data transmission is typically asymmetric with the amount of data transmitted on the FL being greater than on the RL. With an effective power control mechanism on the FL, wherein the transmission power is controlled to maintain the desired level of performance, the overall FL capacity can be improved.

In one embodiment, the remote station transmits an Error-Indicator-Bit, EIB, message to the base station when a transmitted frame of data is received in error. The EIB can be either a bit contained in the reverse traffic channel frame or a separate message sent on the reverse traffic channel. In response to the EIB message, the base station increases its transmission power to the remote station.

One disadvantage of this method is the long response time. The processing delay encompasses the time interval from the time the base station transmits the frame with inadequate power to the time the base station adjusts its transmission power in response to the error message from the remote station. This processing delay includes the time it takes for: (1) the base station to transmit the data frame with inadequate power; (2) the remote station to receive the data frame; (3) the remote station to detect the frame error (e.g. a frame erasure); (4) the remote station to transmit the error message to the base station; and (5) the base station to receive the error message and appropriately adjust its transmission power. The forward traffic channel frame must be received, demodulated, and decoded before the EIB message is generated. Then the reverse traffic channel frame carrying the EIB message must be generated, encoded, transmitted, decoded, and processed before the bit can be used to adjust the transmit power of the forward traffic channel.

Typically, the desired level of performance is one percent Frame Error Rate, FER. Therefore, on the average, the remote station transmits one error message indicative of a frame error every 100 frames. In accordance with the IS-95-A standard, each frame is 20 msec long. This type of EIB based power control works well to adjust the FL transmit power to handle shadowing conditions, but due to its slow speed does not handle fading conditions as well.

One method for controlling the FL transmission power utilizes the $E_b/I_0$ of the received signal at the remote station. Since the FER is dependent on the $E_b/I_0$ of the received signal, a power control mechanism can be designed to maintain the $E_b/I_0$ at the desired level. This design encounters difficulty if data is transmitted on the FL at variable rates. On the FL, the transmission power is adjusted depending on the data rate of the data frame. At lower data rates, each data bit is transmitted over a longer time period by repeating the modulation symbol. The energy-per-bit $E_b$ is the accumulation of the received power over one bit time period and is obtained by accumulating the energy in each modulation symbol. For an equivalent amount of $E_b$, each data bit can be transmitted at proportionally less transmission power at the lower data rates. Typically, the remote station does not know the transmission rate a priori and cannot compute the received energy-per-bit $E_b$ until the entire data frame has been demodulated, decoded, and the data rate of the data frame has been determined, wherein the rate is one power control message per frame. This is in contrast with the RL approach in which there can be one power control message (bit) sixteen times per frame as in one embodiment.

At lower rates, the remote station may not transmit continuously. When the remote station is transmitting, the remote station transmits at the same power level and the same waveform structure regardless of the transmission rate. The base station determines the value of a power control bit and sends this bit to the remote station sixteen times per frame. Since the remote station knows the transmission rate, the remote station can ignore power control bits corresponding to times when it was not transmitting. This permits fast RL power control. However, the effective power control rate varies with the transmission rate. For one embodiment, the rate is 800 bps for full rate frames and 100 bps for ⅛ rate frames.

Original CDMA standards have been optimized for transmission of variable-rate voice frames. In order to support two-way voice communications, as typified in wireless phone applications, it is desirable that a communication system provide fairly constant and minimal data delay. For this reason, many CDMA systems are designed with powerful Forward Error Correction, FEC, protocols and vocoders, which are designed to respond gracefully to voice frame errors. Error control protocols that implement frame retransmission procedures add unacceptable delays for voice transmission.

Packetizing data allows for increased speed and accuracy of communication, and is therefore desirable for wireless data communications. In efforts to integrate wireless and other communication media with the Internet, an increasing number of applications are being developed using a standard Internet Protocol, or IP. This IP is a software standard that describes how to track Internetwork addresses, route messages, and recognize incoming messages; thus allowing a packet of data to traverse various networks on its way from originator to target recipient. The originator is the mobile unit initiating the communication, and the target is the desired participant. Within an IP network, each resource, such as a computer, is assigned an IP address for identification.

In many non-voice applications, such as the transmission of IP data, the delay requirements of the communication system are much less stringent than in voice applications. In the Transmission Control Protocol, TCP, probably the most prevalent of protocols used in an IP network, virtually infinite transmission delays are allowed in order to guarantee error-free transmission. TCP uses retransmissions of IP datagrams, as IP packets are commonly called, to provide this transport reliability.

IP datagrams are transmitted in frames, wherein each frame is defined by a predetermined time duration. Generally, IP datagrams are too large to fit into a single frame as defined for voice transmission. Even after dividing an IP datagram into segments small enough to fit into a set of frames, the entire set of frames would have to be received without error for the single IP datagram to be useful to TCP. The targeted FER typical of a CDMA voice system makes the probability of error-free reception of all segments of a single datagram very low.

CDMA standards provide for such alternative service options, data services for example, to enable the transmission of other types of data in lieu of voice frames. In one embodiment, a Radio Link Protocol, RLP, incorporates an error control protocol with frame retransmission procedures over a CDMA frame layer. RLP is of a class of error control protocols known as Negative Acknowledge-based, or NAK-based, Automatic Repeat Request, or ARQ, protocols, which are well known in the art. The RLP facilitates the transmission of a byte-stream, rather than a series of voice frames, through a CDMA communication system.

FIG. 1 illustrates an architectural layering 10 of an exemplary embodiment of a wireless system protocol. The physical layer 12 indicates the channel structure, frequency, power output, modulation type, and encoding specifications for the forward and RLs. The Medium Access Control, MAC, layer 14 defines the procedures used to receive and transmit over the physical layer 12. For an HDR system, the MAC layer 14 includes scheduling capabilities to balance users or connections. Such balancing typically schedules low throughput for channels with poor coverage, thus freeing up resources allowing high throughput for channels with good connections. Also, the MAC layer processes transmissions when a channel has a good connection. The next layer, the Link Access Control, LAC, layer 16, provides an access procedure for the radio link. According to one embodiment, the Radio Link Protocol, RLP, layer 18 provides retransmission and duplicate detection for an octet-aligned data stream. RLP is of a class of error control protocols known NAK-based ARQ protocols, which are well known in the art. In one embodiment, RLP facilitates the transmission of a byte-stream, rather than a series of voice frames, through a communication system.

In the context of a packet service, the LAC layer 16 carries Point-to-Point Protocol packets, PPP packets. The High Level Data Link Control HDLC layer 20 is a link layer for PPP communications. Control information is placed in specific patterns, which are dramatically different from the data in order to reduce errors. The HDLC layer 20 performs framing of the data prior to PPP processing. The PPP layer 22 then provides compression, authentication, encryption and multi-protocol support. The IP layer 24 keeps track of Internetwork addressing for different nodes, routes outgoing messages, and recognizes incoming messages.

Protocols running on top of PPP, such as IP layer 24, carry user traffic. Note that each of these layers may contain one or more protocols. Protocols use signaling messages and/or headers to convey information to a peer entity on the other side of the air-interface. For example, in a High Data Rate, HDR, system, protocols send messages with a default signaling application.

The architecture 10 is applicable to an Access Network, AN, for providing data connectivity between an IP network, such as the Internet, and access terminals, including wireless mobile units. Access Terminals, ATs, provide data connectivity to a user. An AT may be connected to a computing device such as a laptop personal computer, or may be a self-contained data device such as a personal digital assistant. There are a variety of wireless applications and an ever increasing number of devices, often referred to as IP appliances or web appliances.

As illustrated in FIG. 1, layers above the RLP layer 18 are service network layers and layers below the HDLC layer 20 are radio network layers. In other words, the radio network layers affect the air-interface protocols. The radio network layers of the exemplary embodiment are consistent with those applicable in an HDR system. HDR generally provides an efficient method of transmitting data in a wireless communication system. Alternate embodiments may implement the cdma2000 standard, an IS-95 standard, or other per-user connection systems, such as the "ANSI J-STD-01 Draft Standard for W-CDMA (Wideband Code Division Multiple Access) Air Interface Compatibility Standard for 1.85 to 1.99 GHz PCS Applications," referred to as "W-CDMA."

As illustrated in FIG. 1, in one embodiment of a wireless protocol, several protocol layers typically reside above the RLP layer. IP datagrams, for example, are typically converted into a PPP byte stream before being presented as a byte stream to the RLP protocol layer. As the RLP layer ignores the protocol and framing of higher protocol layers, the stream of data transported by RLP is said to be a "featureless byte stream."

RLP was originally designed to satisfy the requirements of sending large datagrams through a CDMA channel. For example, if an IP datagram of 500 bytes was to be simply sent in frames carrying 20 bytes each, the IP datagram would fill 25 consecutive frames. Without some kind of error control layer, all 25 of these RLP frames would have to be received without error in order for the IP datagram to be useful to higher protocol layers. On a CDMA channel having a 1% frame error rate, the effective error rate of the IP datagram delivery would be $(1-(0.99)^{25})$, or 22%. This is a very high error rate compared to most networks used for IP traffic. RLP was designed as a link layer protocol that would decrease the error rate of IP traffic to be comparable to the error rate typical of a $10^{-2}$ ethernet channel.

In a spread-spectrum wireless communication system, such as a cdma2000 system, multiple users transmit to a transceiver, often a base station, in the same bandwidth at the same time. The base station may be any data device that communicates through a wireless channel or through a wired channel, for example, using fiber optic or coaxial cables. A user may be any of a variety of mobile and/or stationary devices including but not limited to a PC card, a compact flash, an external or internal modem, or a wireless or a wireline phone. A user is also referred to as a remote station. Note that alternate spread-spectrum systems include, but are not limited to, systems such as: packet-switched data services; Wideband-CDMA, W-CDMA, systems, such as specified by Third Generation Partnership Project, 3GPP; voice and data systems, such as specified by Third Generation Partnership Project Two, 3GPP2.

Figure 2:
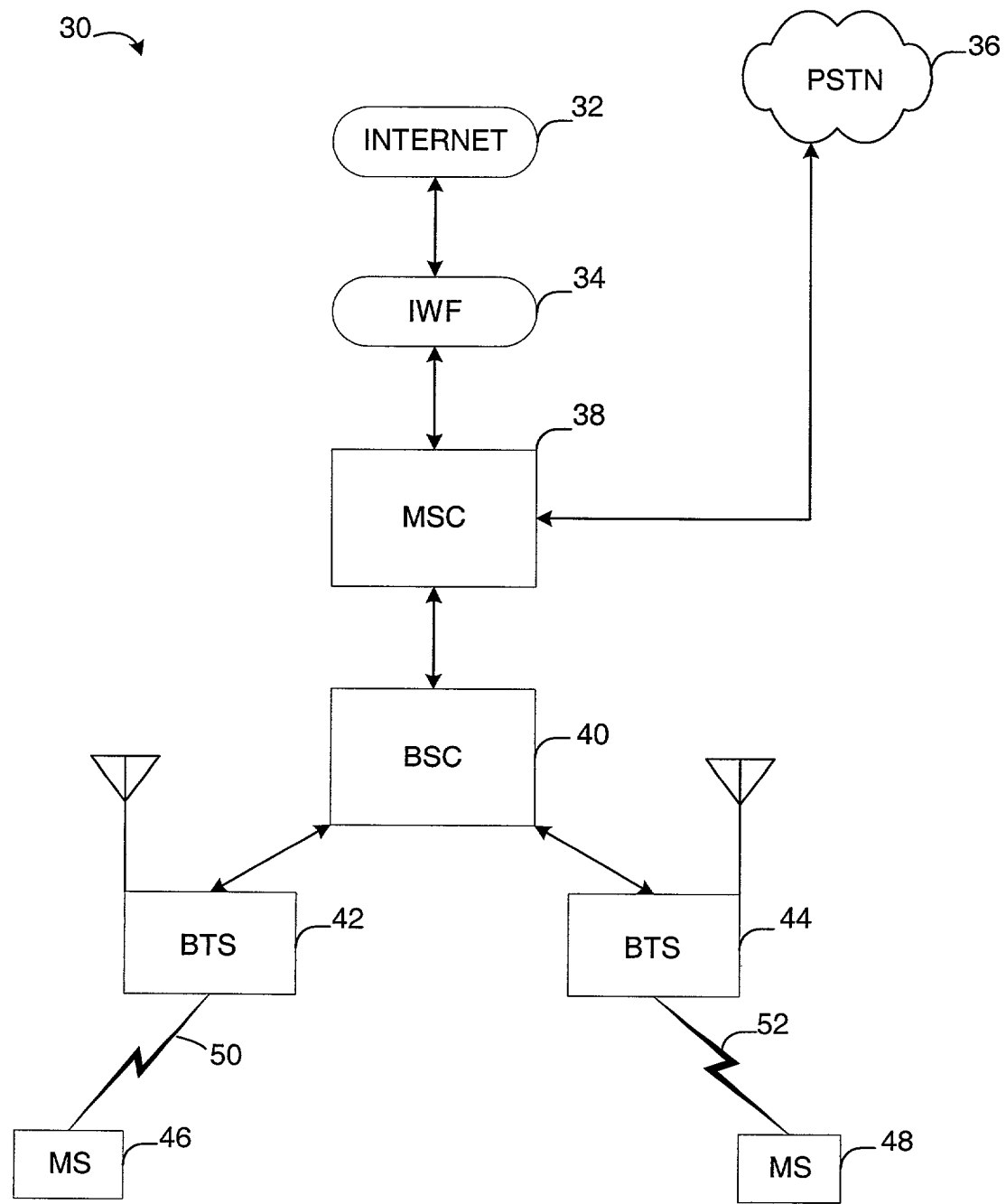
FIG. 2 is a diagram of a wireless communication system.

FIG. 2 illustrates one embodiment of a wireless communication system 30, wherein system 30 is a spread spectrum CDMA system capable of voice and data transmissions. System 30 includes two segments: a wired subsystem and a wireless subsystem. The wired subsystem is the Public Switched Telephone Network, PSTN 36, and the Internet 32. The Internet 32 portion of the wired subsystem interfaces with the wireless subsystem via Inter-Working Function Internet, IWF 34. The ever-increasing demand for data communications is typically associated with the Internet and the ease of access to the data available thereby. However, advancing video and audio applications increase the demand for transmission bandwidth.

The wired subsystem may include but is not limited to other modules such as an instrumentation unit, a video unit, etc. The wireless subsystem includes the base station subsystem, which involves the Mobile Switching Center, MSC 38, the Base Station Controller, BSC 40, the Base Transceiver Station(s), BTS(s) 42, 44, and the Mobile Station(s), MS(s) 46, 48. The MSC 38 is the interface between the wireless subsystem and the wired subsystem. It is a switch that talks to a variety of wireless apparatus. The BSC 40 is the control and management system for one or more BTS(s) 42, 44. The BSC 40 exchanges messages with the BTS(s) 42, 44 and the MSC 38. Each of the BTS(s) 42, 44 consists of one or more transceivers placed at a single location. Each of the BTS(s) 42, 44 terminates the radio path on the network side. The BTS(s) 42, 44 may be co-located with BSC 40 or may be independently located.

The system 30 includes radio air interface physical channels 50, 52 between the BTS(s) 42, 44 and the MS(s) 46, 48. The physical channels 50, 52 are communication paths described in terms of the digital coding and RF characteristics.

As discussed hereinabove, a FL is defined as a communication link for transmissions from one of the BTS(s) 42, 44 to one of the MS(s) 46, 48. An RL is defined as a communication link for transmissions from one of the MS(s) 46, 48 to one of the BTS(s) 42, 44. According to one embodiment, power control within system 30 includes controlling transmit power for both the RL and the FL. Multiple power control mechanisms may be applied to the FL and RL in system 30, including reverse open loop power control, reverse closed loop power control, forward closed loop power control, etc. Reverse open loop power control adjusts the initial access channel transmission power of MS(s) 46, 48, and compensates for variations in path loss attenuation of the RL. The RL uses two types of code channels: traffic channel(s), and access channel(s).

Note that for data services a remote station may be referred to as an AT, wherein an AT is a device providing data connectivity to a user. An AT may be connected to a computing device, such as a laptop personal computer, or it may be a self-contained data device, such as a personal digital assistant. Further, the base station may be referred to as an AN, wherein the AN is network equipment providing data connectivity between a packet switched data network, such as the Internet, and at least one AT. The reverse access channel is used by ATs to communicate with the AN when no traffic channel is assigned. In one embodiment there is a separate reverse access channel for each sector of the AN.

Referring to FIG. 2, each communication channel 50, 52 includes a FL, carrying information from BTS(s) 42, 44 to MS(s) 46, 48, and a RL, carrying information from BTS(s) 42, 44 to MS(s) 46, 48. Information communicated between BTS(s) 42, 44 to MS(s) 46, 48 respectively, is required to meet a predetermined reliability level. In the exemplary embodiment, the information on FL is transmitted in frames, and the required reliability level is expressed as a target FER as received by the MS(s) 46, 48.

One method of achieving the required FER in a system such as system 30 is retransmission of transmitted information. A transmitting station transmits information, contained in frames, with a first energy $E_1$. The transmitted information is received by a receiving station with a first frame error rate $FER_1$, wherein the subscript 1 refers to the first or original transmission. The receiving station reports the first $FER_1$ and identity of those frames received in error back to the transmitting station. The transmitting station selects a second transmission energy $E_2$, and re-transmits the frames received in error. The receiving station receives the frames with a second frame error rate $FER_2$, wherein the subscript 2 refers to the second transmission. Alternate embodiments may include any number of retransmission, wherein each retransmission i has an associated $E_i$; and $FER_i$. When the energies $E_1$ and $E_2$ are properly selected, the effective FER after the second transmission will be equal to the target FER. In other words, the total frame error rate resulting from the transmission and retransmission will be equal to a target FER. There are an infinite number of combinations of $E_1$ and $E_2$ that would achieve an effective FER equal to the target FER.

As communications systems, and CDMA communication systems in particular, are noise limited, it is advantageous to choose $E_1$ and $E_2$ in a manner yielding minimum total transmission energy. The total transmission energy, (E), is equal to the energy used for the first transmission plus the energy for retransmission of those frames initially received in error, wherein $(E)=E_1+f(E_1)\cdot E_2$. $E_1$ is energy for the first transmission, $E_2$ is energy for retransmission, and $f(E_1)$ is a frame error rate for transmission with energy $E_1$. The condition that the effective FER be equal to the target FER can be expressed as $T_{FER}=f(E_1) \cdot f(E_2)$, wherein $T_{FER}$ is the target frame error rate. The effective frame error rate is the product of $f(E_1)$, a frame error rate for transmission with energy $E_1$, and $f(E_2)$, a frame error rate for transmission with energy $E_2$.

The task of selecting $E_1$ and $E_2$ for minimal total energy <E>, while assuring that effective FER after the second transmission will be equal to the target FER, is equivalent to solving for <E> subject to $T_{FER}$. Such solution requires the knowledge of the FER as a function of energy or a measure of energy, wherein FER=f(E). The energy measure E may, for example, be the Energy-per-bit to Noise ratio $$\left(\frac{E_b}{N_0}\right).$$

This relationship is a function of several variables, including, but not limited to, attenuation, fading, the number of multipaths, the relative velocity of remote station with respect to the base station, etc.

Retransmission provides error correction in a wireless communication system that is particularly applicable to packetized data transmissions. The retransmission may be performed at an increased energy level with respect to the energy level of the original transmission. The process of increasing the energy level used for retransmission is referred to as "power boosting." In one embodiment, power boosting assumes that the energy level of the first transmission was not sufficient to achieve the target frame error rate, and, therefore, increased energy is applied to subsequent retransmission. Power boosting may reduce the total energy used to achieve a target FER as compared to retransmission at a same energy level as the original transmission, i.e., equal energy case.

As illustrated in FIG. 3, for the case of a single transmission that satisfies the target FER, the $FER_0$ corresponds to one transmission at a power level $E_0$. At the energy level, $E_0$, the transmitted frames are received with an acceptable FER to allow further processing. In a single transmission scenario, the power control outer loop adjusts the energy level $E_0$ in response to the FER of the received transmission. The FER may be provided from the receiver back to the base station by way of a FER message. In one embodiment, the mobile station provides an Error Indication Bit, EIB, as feedback to the base station.

FIG. 4 illustrates a specification for transmission and retransmission. In one embodiment, equal energy is used for transmission and retransmission. The target FER is achieved by application of $FER_1$ to the transmission and $FER_2$ to the retransmission. The total effective FER is equal to $FER_1*FER_2$. On the first transmission the energy level is set to $E_1$, while the retransmission applies an energy level $E_2$.

According to an equal power scenario, $FER_1$ is equal to $FER_2$, and the corresponding energy levels are equal, i.e., $E_1=E_2$. A target FER is given as $FER_1*FER_2$. In this case, the individual energy levels, $E_1$ and $E_2$, are each less than the energy level $E_0$ of the single transmission case of FIG. 3.

According to one embodiment, the specified FER values are not equal, but rather $FER_1$ is less than $FER_2$. The lesser energy is applied to the original transmission in order to reduce transmission power and is used to achieve the target FER. If the first transmission achieves the target FER, there is no retransmission of data. In contrast, if the first transmission does not achieve the target FER, a retransmission is processed at an increased energy level $E_2$. The increase in energy assumes that $E_1$ was insufficient to achieve the target FER.

Figure 5:
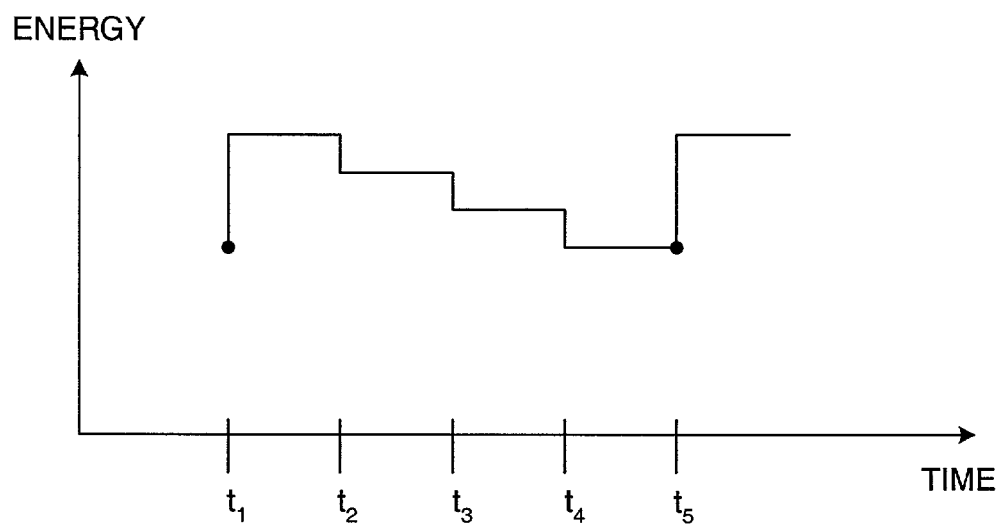
FIG. 5 is a timing diagram illustrating outer loop adjustment of a closed loop power control method in a wireless system.

According to one embodiment, $E_1$ and $E_2$ are maintained at a predetermined relation. Power control as illustrated in FIG. 5 is used to adjust the $E_1$ to achieve the specified $FER_1$. In response, the value of $E_2$ is calculated based on the adjusted value of $E_1$ to maintain the predetermined relation. Maintaining the relationship between energy setpoints is easily implemented by software instruction.

In an alternate embodiment, parallel power control loops, such as illustrated in FIG. 5, are used to adjust $E_1$ and $E_2$. The retransmission frame errors are used to adjust the energy level $E_2$, while the transmission frame errors are used to adjust the energy level $E_1$. Dynamic adjustment to different FER values provides improved power control. In this case, a criteria is applied for updating the FER value(s) such as an update trigger. In one embodiment, the FER adjustment is triggered on occurrence of an error. Alternate embodiments may adjust the FER on occurrence of a predetermined number of errors. Additionally, the adjustments to $E_1$ and $E_2$ may be different allowing the ratio between them to change. In one embodiment, the step values for incremental adjustments to adjust $E_1$ and $E_2$ are directional, wherein a first value is used to increment $E_1$ and second value to increment $E_2$. Similarly, according to one embodiment a third value is used to decrement $E_1$ and a fourth value to decrement $E_2$. Alternate embodiments may use a same value for any of the increment steps or may use any combination of increment values. Similarly, the increment values may be adjusted dynamically based on performance of the system.

FIG. 5 illustrates the power control outer loop, wherein the base station applies a sawtooth adjustment to the transmission energy level in response to feedback from the mobile station. The process is illustrated as a function of time. For a given transmission between a base station and a mobile station, the base station adjusts the transmission energy in response to a received EIB (not shown). Assertion of the EIB corresponds to a frame error indication, while negation of the EIB corresponds to no frame error. On assertion of the EIB, the transmission energy is increased by a predetermined increment value or step size. On negation of EIB, the transmission energy is decreased by a predetermined decrement value or step size. At time $t_1$ a first frame error is indicated by assertion of the EIB. In response, the base station increases or boosts the energy level for a next retransmission. As illustrated, at times $t_2$, $t_3$, $t_4$ the frame errors of the received frames are below the target FER, and the corresponding EIBs are negated. On occurrence of each EIB negation, the transmission energy level is decremented by a predetermined amount. At time $t_5$ a second frame error is detected and the corresponding EIB is asserted. In response, the base station increases the transmission energy. According to one embodiment, the ratio of the step size is equal to 1/FER. The error message may be an EIB, or alternately may be a Negative Acknowlege or NAK signal. Alternate embodiments may implement any signal that provides information to the base station regarding the transmission and/or retransmission quality, such as acknowledging the transmission or acknowledging the transmission was received incorrectly.

Figure 6:
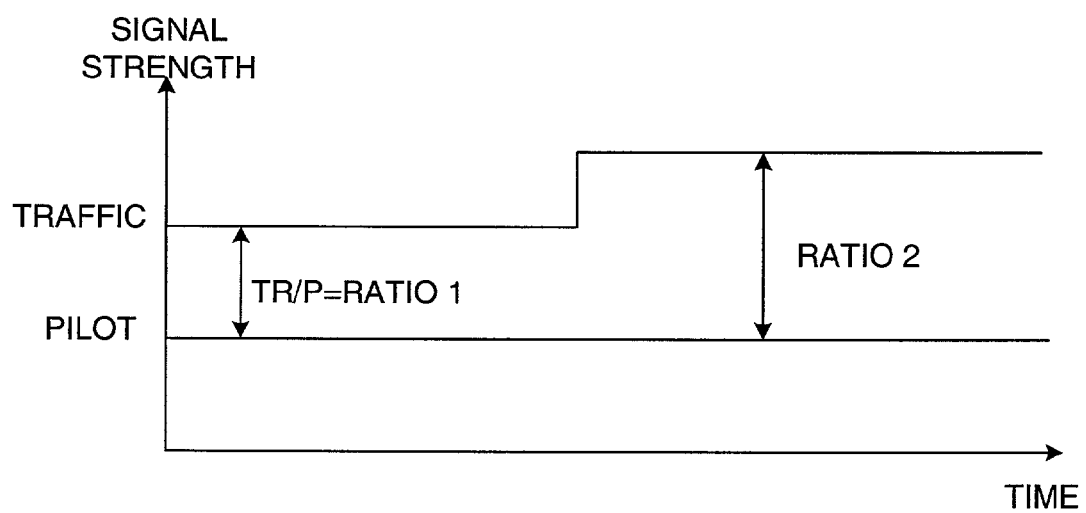
FIG. 6 is a timing diagram illustrating the ratio of traffic signal strength to pilot signal strength in a wireless system.

FIG. 6 illustrates the relation between traffic signal strength and pilot signal strength according to one embodiment. As illustrated, during a first portion of operation, the ratio of traffic to pilot is maintained at a first ratio labeled RATIO1. The transmitter may boost the ratio to RATIO2 in response to inter-frequency hard handoff or other event. According to one embodiment, a wireless communication system performs power control of the pilot signal, such as the RL pilot signal. On occurrence of frame error rates, the TR/P ratio is adjusted as illustrated in FIG. 6. Once the pilot signal is adjusted in response to power control, the energies of transmission and retransmission, respectively, are calculated as TR/P ratios, while the pilot is maintained at a constant level. As illustrated in FIG. 6, RATIO1 corresponds to transmission, while RATIO2 corresponds to retransmission. While the pilot remains at a constant energy level, the energies of transmission and retransmission are determined with respect to their relationship with the pilot energy level. According to one embodiment, power control is performed on the pilot signal of the RL and the transmission and retransmission energies are adjusted in response. The TR/P ratios associated with transmission and retransmission may be dynamically adjusted with respect to each other in response to operation of the system. The TR/P ratio(s) are determined to achieve a target FER.

For implementing outer loop power control, often the target FERs for transmission and retransmission are determined off-line by simulation to provide robust, consistent performance over a variety of operating conditions. In general, the transmission FER, or $FER_1$, is not equal to the retransmission FER, $FER_2$.

Figure 7:
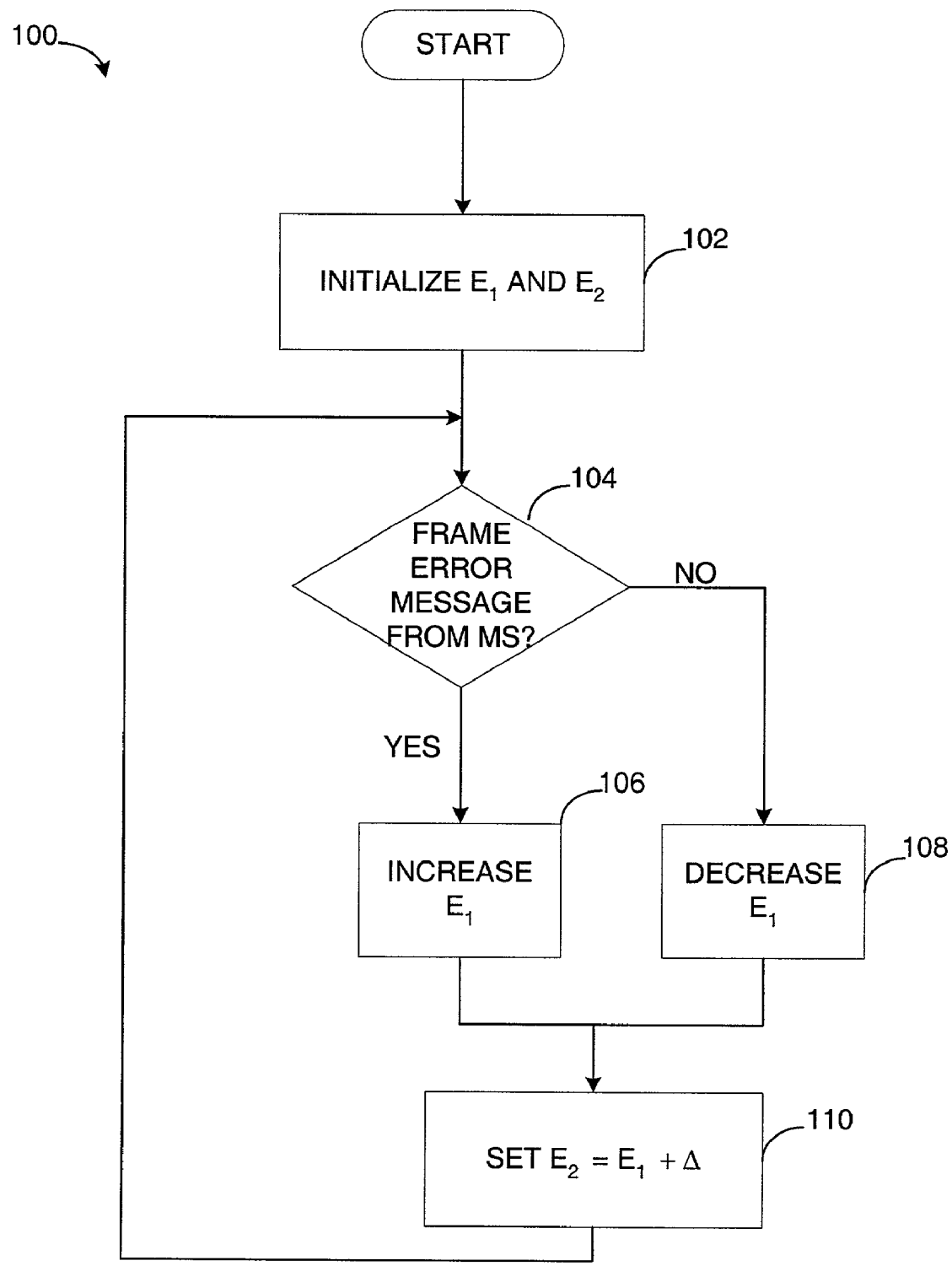
FIG. 7 is a flow diagram of a method for energy setpoint adjustment in a wireless communication system.

FIG. 7 illustrates a method 100 for implementing outer loop power control at the base station. The process starts at step 102 by initializing $E_1$ and $E_2$ prior to transmission. Default values for $FER_1$ and $FER_2$, as well as $E_1$ and $E_2$, are determined prior to transmission and may be based on simulations done to optimize performance of the system. A variety of criteria may be used to determine the default values. In one embodiment, the default values are used to initiate transmissions, wherein the values are updated based on feedback from the mobile station relating to frame errors received. At decision diamond 104, the base station determines if a frame error message was sent by the mobile station. If no error message was received, the process continues to step 108 to decrease the energy level $E_1$. If an error message was received at decision diamond 104, the base station increases the energy level $E_1$ at step 106. After $E_1$ adjustment, processing continues to step 110 to set $E_2$ equal to $E_1$ plus a delta value. After a predetermined time period, processing returns to decision diamond 104 to check for receipt of an error message. In one embodiment, the frame error message is an EIB message, wherein the $E_1$ adjustment is according to a sawtooth pattern, such as illustrated in FIG. 5. In this way, the sawtooth adjustment is made to the energy level $E_1$ of the first transmission, while the retransmission energy level $E_2$ is calculated as a function of $E_1$. As most errors occur on the first transmission, the $E_1$ level is adjusted first, while a difference is maintained between $E_1$ and $E_2$. The difference between $E_1$ and $E_2$ may be a predetermined fixed value, or may be dynamically adjusted as a function of performance. In one embodiment, $E_2$ is a function of $E_1$, wherein the difference between $E_1$ and $E_2$ changes according to the performance of the link.

Figure 8:
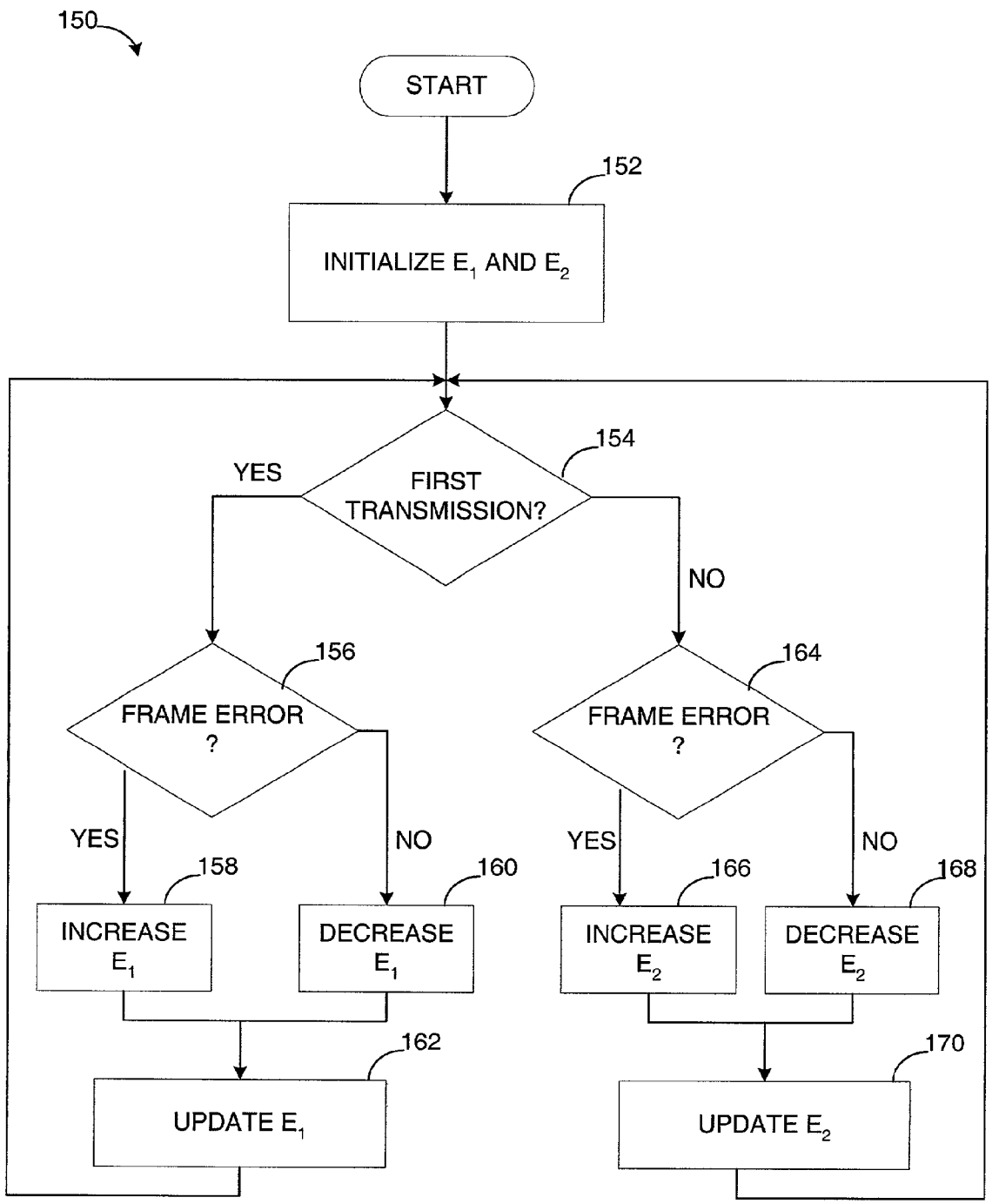
FIG. 8 is a diagram of an alternate method for energy setpoint adjustment in a wireless communication system.

FIG. 8 illustrates an alternate method 150, wherein both $E_1$ and $E_2$ are updated to provide target $FER_1$ and $FER_2$, respectively. The values of $E_1$ and $E_2$ are initialized at step 152. According to one embodiment, the values for $FER_1$ and $FER_2$ are determined off-line by computer simulation using statistical information regarding operation of the system and the type of data transmitted. The initialization values of $E_1$ and $E_2$ may also be determined off-line as a function of the $FER_1$ and $FER_2$ values, respectively. At decision diamond 154 the method includes a determination of whether the current communication is a transmission or a retransmission. On the first transmission, processing continues to the path of decision diamond 156. If a frame error is detected at decision diamond 156 the energy setpoint $E_1$ is increased or incremented at step 158, else the energy setpoint is decreased or decremented at step 160. The present embodiment effectively implements a sawtooth adjustment similar to that illustrated in FIG. 5. The increment and decrement values may be predetermined fixed value(s) or may be dynamically adjusted based on operation of the system. In one embodiment the increment value and the decrement value have equal absolute value. From steps 158 and 160 the energy setpoint $E_1$ is updated at step 162 and after a predetermined time period processing returns to decision diamond 154 for the next communication. According to one embodiment, the next communication is the next frame.

Continuing with the method 150 of FIG. 8, for a retransmission, processing continues from decision diamond 154 to the path of decision diamond 164. If a frame error is detected at decision diamond 164, the energy setpoint $E_2$ is increased or incremented at step 166, else the energy setpoint is decreased or decremented at step 168. The present embodiment effectively implements a separate sawtooth adjustment similar to that illustrated in FIG. 5 for energy setpoint $E_2$. The increment and decrement values may be predetermined fixed value(s) or may be dynamically adjusted based on operation of the system. In one embodiment the increment value and the decrement value have equal absolute value. From steps 166 and 168 the energy setpoint $E_2$ is updated at step 170 and after a predetermined time period processing returns to decision diamond 154 for the next communication.

Note that alternate embodiments may implement multiple retransmissions, each having an associated FER such as $FER_1$ and an associated energy setpoint $E_1$. The values of each $E_1$ may be the same as the adjusted value of $E_2$, or may each be individually calculated in a processing path similar to that of decision diamond 164. In one embodiment, the value(s) of $E_1$ are calculated as function(s) of $E_2$, such as to maintain a predetermined ratio with $E_2$.

Figure 9:
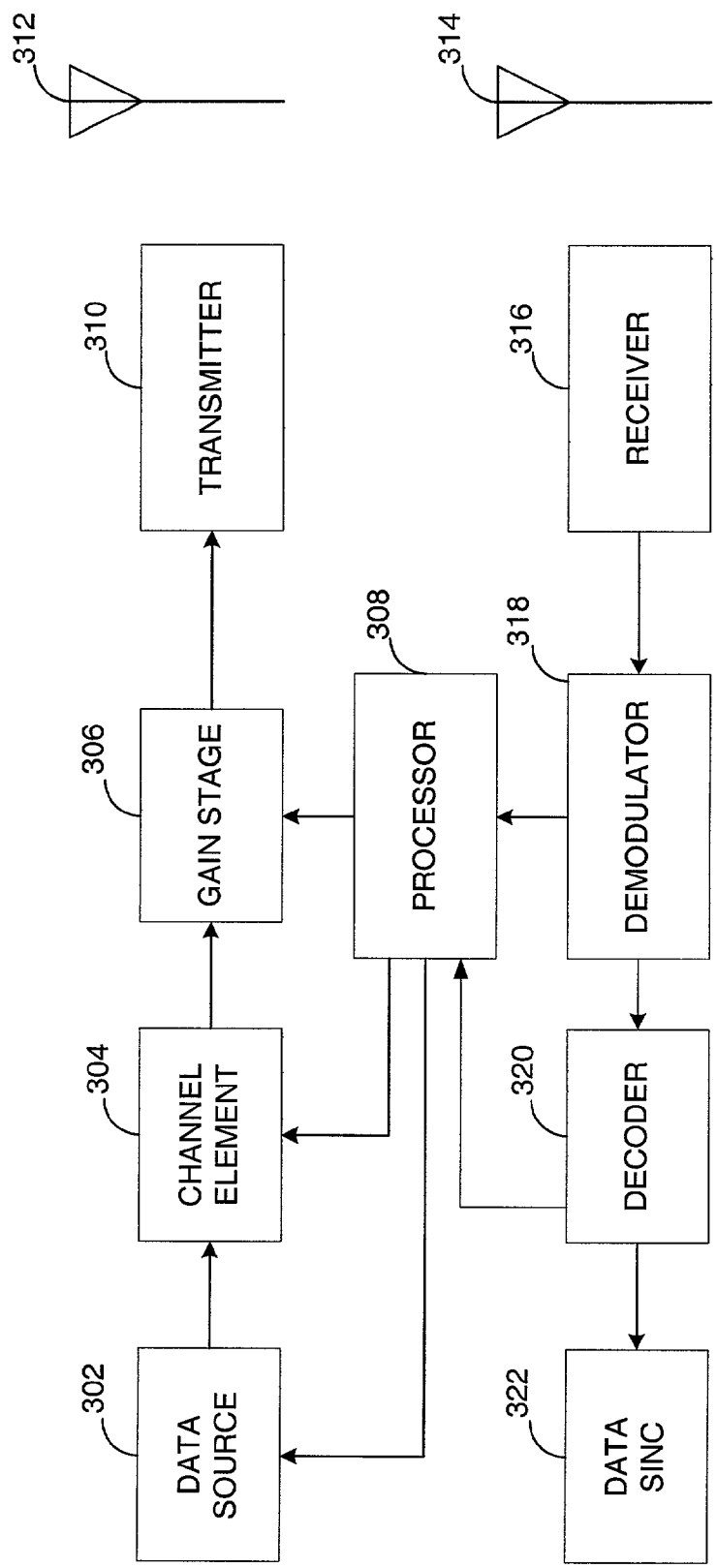
FIG. 9 is a diagram of a transceiver in a wireless communication system.

FIG. 9 is a block diagram of an exemplary embodiment of a transmitting station operative in a wireless communication system. The information to be transmitted is generated by a data source 302, and is provided to a channel element 304, which partitions the data, CRC encodes the data, and inserts code tail bits as required by the system. Channel element 304 then convolutionally encodes the data, CRC parity bits, and code tail bits, interleaves the encoded data, scrambles the interleaved data with the user long PN sequence, and covers the scrambled data with a Walsh sequence. The channel element 304 then provides the covered data to a gain stage 306, which scales the data in response to a signal from a processor 308, such that the data with required energy $E_1$ is provided to a transmitter 310. The transmitter 310 spreads the scaled data with the short $PN_1$ and $PN_Q$ sequences. The spread data is then modulated with the in-phase and quadrature sinusoids, and the modulated signal is filtered, upconverted, and amplified. The signal is transmitted on the forward channel if the transmitting station is a base station, or reverse channel if the transmitting station is a remote station.

The feedback signal from the receiving station is received by an antenna 314, and is provided to receiver 316. Receiver 316 filters, amplifies, downconverts, quadrature demodulates, and quantizes the signal. The digitized data is provided to demodulator 318, which despreads the data with the short $PN_1$ and $PN_Q$ sequences, and decovers the despread data with the Walsh sequence. The despread data from different correlators within demodulator 318 are combined and descrambled with the user long PN sequence. The descrambled (or demodulated) data is provided to decoder 320 which performs the inverse of the encoding performed within channel element 304. The decoded data is provided to data sink 322, and the processor 308.

Processor 308 is configured to control gain stage 306 so as to scale the data to be transmitted to a power. Processor 308 is responsive to information provided by the decoder 320, whether the transmission was received at the receiving station without error. Processor 308 further controls the data source 302 together with the channel element 304, and the gain stage 306 to re-transmit information frames that had been received in error with the next available energy.

Figure 10:
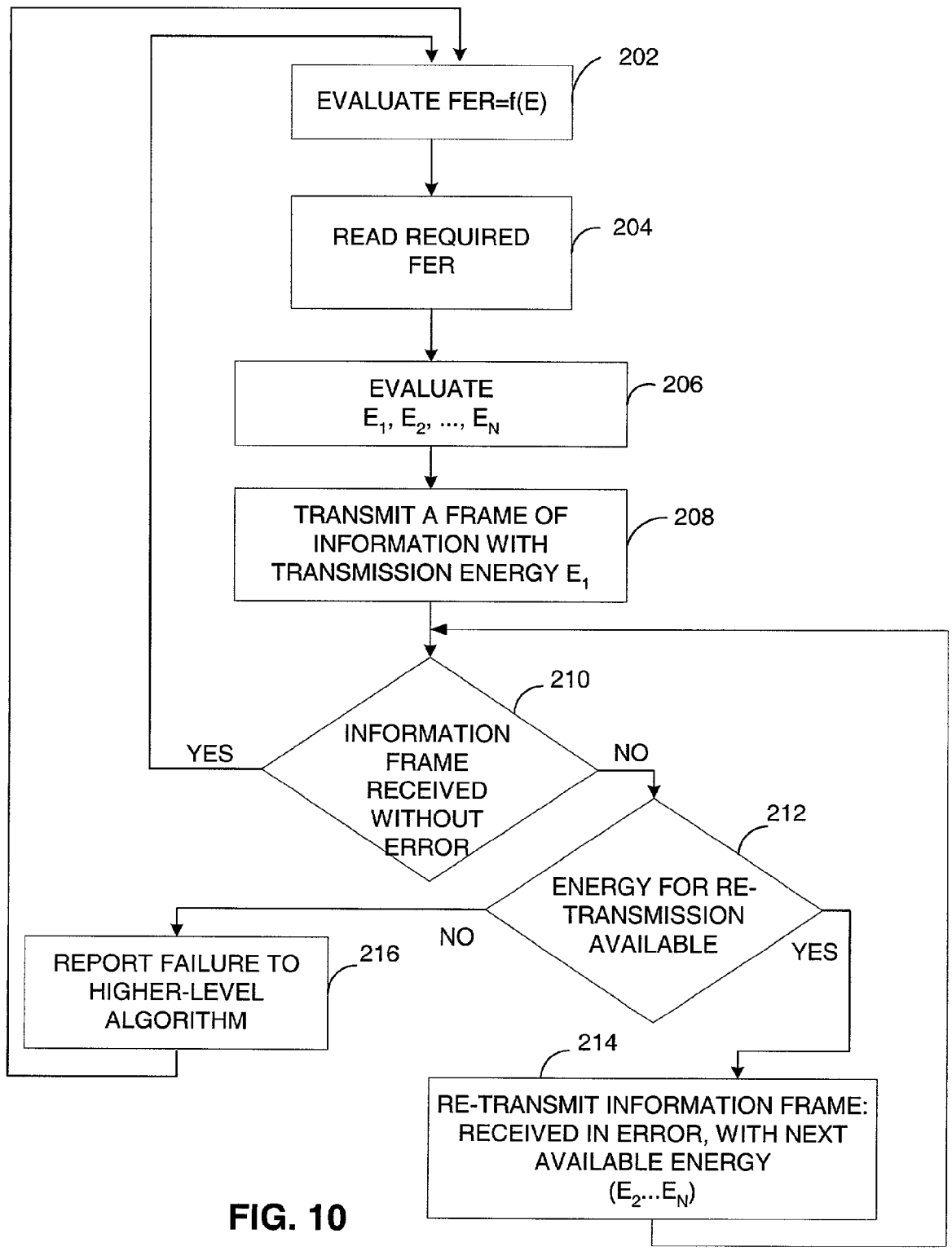
FIG. 10 is a diagram of a method of energy setpoint adjustment in a wireless communication system.

FIG. 10 is a flowchart showing load estimation in accordance with one wireless system, such as illustrated in FIG. 9. Flow begins in block 202 in which the transmitting station evaluates FER as a function of energy. In one embodiment, the transmitting station adaptively evaluates feedback information received from the receiving station. In another embodiment, the transmitting station evaluates conditions of a transmission channel, e.g., attenuation, fading, number of multipaths, relative velocity of the RS and the BS, data rate. The transmitting station then uses a look-up table, containing simulated FER as a function of energy for all potential channel conditions, to select the proper relationship for given conditions.

In block 204, the transmitting station reads the required FER. In block 206, the transmitting station evaluates the transmission energy for initial transmission $E_1$, and potential retransmissions $E_2, \ldots, E_N$, in accordance with the principles outlined above. Thus, the transmitting station can use a pre-computed solution in the form of a look-up table when appropriate, or algorithms solving by analytical or numerical methods.

In block 208, the transmitting station transmits a frame of the information with transmission energy set to a value of $E_1$. In block 210, the transmitting station evaluates whether the information frame transmitted was received without error. If the report from the receiving station is positive, the flow restarts in block 202. If the report from the receiving station is negative, the transmitting station evaluates in decision diamond 212, whether there is another transmission energy $E_2, \ldots E_N$. If the result of evaluation is positive, the transmitting station continues in block 214, by re-transmitting information frames that had been received in error with the next available energy, and the flow returns to block 210. If the result of evaluation is positive, the transmitting station reports the failure to a higher level algorithm in block 216, and the flow continues in block 202.

Note that the methods illustrated in FIGS. 7 and 8 are also applicable to a system such as illustrated in FIG. 9. Software to adjust the energy setpoint(s) may be stored in the processor 308 or may be stored in an alternate memory storage location (not shown). The adjusted energy setpoint(s) are transmitted to a remote station via transmitter 310 and antenna 312. The error message(s), such as an EIB message or a frame error indicator, etc., is received by receiver 316 via antenna 314.

According to one embodiment, the initializations of the transmission energy setpoint $E_1$ and the retransmission energy setpoint $E_2$ are performed by processor 308. Similarly, processor 308 determines if an error message was received from a remote station, and increases or decreases $E_1$ in response. The processor 308 also adjusts $E_2$ in response to $E_1$. The delta value may be determined by processor 308 or may be stored in a memory storage device (not shown).

According to another embodiment, the processor 308 adjusts the transmission setpoint $E_1$ on the first transmission, and adjusts the retransmission setpoint $E_2$ on the retransmission. In this embodiment, the processor 308 determines if the current communication is a transmission or a retransmission. For a transmission, if a frame error is received, the processor 308 increases $E_1$ else the processor 308 decreases $E_1$. For a retransmission, if a frame error is received, the processor 308 increases $E_2$ else the processor 308 decreases $E_2$. The increment and decrement values may be predetermined to a fixed value or may dynamically adjust based on performance of the system or some other criteria. In this embodiment, the processor 308 adjusts each energy setpoint $E_1$ and $E_2$ separately, wherein the $E_2$ adjustment is not necessarily a function of the $E_1$ adjustment. In one embodiment, the $E_1$ and $E_2$ adjustments are done according to a sawtooth adjustment such as illustrated in FIG. 5.

In one embodiment power control is implemented at the physical layer. The physical layer implementation provides speed for retransmission adjustment. As the physical layer implements the processes instructed by higher layers, it is not easy to keep track of transmission and/or retransmission quality. In an alternate embodiment, power control is performed at the RLP layer which is better adapted for the bookkeeping involved in tracking transmission and/or retransmission quality. The RLP layer introduces a delay in the processing and therefore is not able to adjust the energy setpoints as accurately.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor; a Digital Signal Processor, DSP; an Application Specific Integrated Circuit, ASIC; a Field Programmable Gate Array, FPGA; or other programmable logic device; discrete gate or transistor logic; discrete hardware components; or any combination thereof designed to perform the functions described herein. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory, RAM; flash memory;

Read Only Memory, ROM; Electrically Programmable ROM, EPROM; Electrically Erasable Programmable ROM, EEPROM; registers; hard disk; a removable disk; a Compact-Disk ROM, CD-ROM; or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A transmitter, comprising:
a processor operative to control an initial transmission and retransmission of data; and
a memory storage device operative for storing a plurality of computer-executable instructions to be executed by the processor comprising:
a first set of instructions for receiving an initial transmission frame error rate and a retransmission frame error rate from a receiver in response to one or more previously transmitted frames;
a second set of instructions for determining and adjusting an initial transmission energy setpoint as a function of the initial transmission frame error rate and an initial transmission quality and exclusive of any retransmission frame error rate, wherein the determination of the initial transmission energy setpoint is responsive to an update trigger; and
a third set of instructions for determining and adjusting a retransmission energy setpoint as a function of the retransmission frame error rate and a retransmission quality, wherein the determination of the retransmission energy setpoint is responsive to the update trigger.

2. The transmitter of claim 1, wherein the initial transmission quality is measured by a received error indication signal.

3. The transmitter of claim 1, wherein the initial transmission energy setpoint and the retransmission energy setpoint are determined as traffic to pilot ratios.

4. The transmitter of claim 1, wherein the third set of instructions determines the retransmission energy setpoint as a function of the retransmission frame error rate, the retransmission quality, and the initial transmission energy setpoint.

5. The transmitter of claim 4, wherein the third set of instructions determines the retransmission energy setpoint by adding a delta value to the initial transmission energy setpoint.

6. In a wireless communication system, a method comprising:
determining an initial transmission energy setpoint to achieve an initial transmission frame error rate in an initial transmission of data;
repeatedly adjusting the initial transmission energy setpoint on occurrence of an initial transmission error in the initial transmission at a processor and exclusive of any retransmission frame error rate, wherein the initial transmission error is received from a receiver;
determining a retransmission energy setpoint to achieve a retransmission frame error rate in a retransmission of the data; and
adjusting the retransmission energy setpoint on occurrence of a retransmission error in the retransmission, wherein the retransmission error is received from the receiver.

7. The method of claim 6, wherein adjusting the retransmission energy setpoint further comprises:
adjusting the retransmission energy setpoint as a function of the initial transmission energy setpoint.

8. The method of claim 6, wherein adjusting the retransmission energy setpoint further comprises:
adjusting the retransmission energy setpoint to achieve a desired frame error rate for retransmission.

9. The method of claim 6, wherein repeatedly adjusting the initial transmission energy setpoint further comprises:
adjusting the initial transmission energy setpoint to achieve a desired frame error rate for transmission.

10. The method of claim 6, wherein the initial transmission frame error rate is greater than the retransmission frame error rate.

11. The method of claim 6, wherein the initial transmission frame error rate and the retransmission frame error rate result in a desired total frame error rate.

12. The method of claim 6, wherein the initial transmission frame error rate and the retransmission frame error rate are predetermined values.

13. The method of claim 6, wherein the initial transmission frame error rate and the retransmission frame error rate are dynamic values.

14. A non-transitory computer-readable medium encoded with computer executable instructions, comprising:
a first set of instructions for receiving an initial transmission frame error rate and a retransmission frame error rate from a receiver in response to one or more previously transmitted frames;
a second set of instructions for determining and adjusting an initial transmission energy setpoint as a function of the initial transmission frame error rate and an initial transmission quality and exclusive of any retransmission framer error rate, wherein the determination of the initial transmission energy setpoint is responsive to an update trigger; and
a third set of instructions for determining and adjusting a retransmission energy setpoint as a function of the retransmission frame error rate and a retransmission quality, wherein the determination of the retransmission energy setpoint is responsive to the update trigger.

15. The computer-readable medium of claim 14, wherein the initial transmission quality is measured by a received error indication signal.

16. The computer-readable medium of claim 14, wherein the initial transmission energy setpoint and the retransmission energy setpoint are determined as traffic to pilot ratios.

17. The computer-readable medium of claim 14, wherein the third set of instructions determines the retransmission energy setpoint as a function of the retransmission frame error rate, the retransmission quality, and the initial transmission energy setpoint.

18. An apparatus, comprising:
means for determining an initial transmission energy setpoint to achieve an initial transmission frame error rate in a an initial transmission of data;
means for repeatedly adjusting the initial transmission energy setpoint on occurrence of an initial transmission error in the initial transmission and exclusive of any retransmission frame error rate, wherein the initial transmission error is received from a receiver;

means for determining a retransmission energy setpoint to achieve a retransmission frame error rate In a retransmission of the data; and means for adjusting the retransmission energy setpoint on occurrence of a retransmission error in the retransmission, wherein the retransmission error is received from the receiver.

19. The apparatus of claim 18, wherein the means for adjusting the retransmission energy setpoint further comprises:

means for adjusting the retransmission energy setpoint as a function of the initial transmission energy setpoint.

20. The apparatus of claim 18, wherein the means for adjusting the retransmission energy setpoint further comprises:

means for adjusting the retransmission energy setpoint to achieve a desired frame error rate for retransmission.

21. The apparatus of claim 18, wherein the means for repeatedly adjusting the initial transmission energy setpoint further comprises:

means for adjusting the initial transmission energy setpoint to achieve a desired frame error rate for transmission.

\* \* \* \* \*